United States Patent
Wang

(10) Patent No.: US 7,919,024 B2
(45) Date of Patent: *Apr. 5, 2011

(54) PROCESSES FOR PRODUCING MONOLITHIC POROUS CARBON DISKS FROM AROMATIC ORGANIC PRECURSORS

(75) Inventor: Jing Wang, Amherst, MA (US)

(73) Assignee: ElectroMaterials, Inc., Amherst, MA (US)

( * ) Notice: Subject to any disclaimer, the term of this patent is extended or adjusted under 35 U.S.C. 154(b) by 1271 days.

This patent is subject to a terminal disclaimer.

(21) Appl. No.: 11/202,989

(22) Filed: Aug. 11, 2005

(65) Prior Publication Data

US 2006/0033226 A1 Feb. 16, 2006

Related U.S. Application Data

(63) Continuation-in-part of application No. 10/919,450, filed on Aug. 16, 2004.

(51) Int. Cl.
*C01B 31/02* (2006.01)
*C01B 31/08* (2006.01)

(52) U.S. Cl. .................... 264/29.6; 264/105; 423/445 R

(58) Field of Classification Search .................. 264/29.1, 264/29.5, 29.6, 105; 423/445
See application file for complete search history.

(56) References Cited

U.S. PATENT DOCUMENTS

| | | | |
|---|---|---|---|
| 5,172,307 A | 12/1992 | Tabuchi et al. | |
| 5,231,162 A | 7/1993 | Nagata | |
| 5,776,633 A | 7/1998 | Mrotek et al. | |
| 5,973,912 A | 10/1999 | Kibi et al. | |
| 6,025,020 A | 2/2000 | Chen et al. | |
| 6,315,971 B1 | 11/2001 | Wallace et al. | |
| 6,544,648 B1 | 4/2003 | Nesbitt et al. | |
| 2002/0057549 A1* | 5/2002 | Oyama et al. | 361/303 |
| 2005/0229781 A1* | 10/2005 | Hori et al. | 95/90 |

OTHER PUBLICATIONS

Yudin, V.E. et al. "Carbon/carbon composites based on a polyimide matrix with coal tar pitch" Carbon (2002) pp. 1427-1433 vol. 40.

* cited by examiner

*Primary Examiner* — Leo B Tentoni
(74) *Attorney, Agent, or Firm* — Jackson Walker L.L.P.

(57) ABSTRACT

Disclosed are processes for producing monolithic and metal doped monolithic porous carbon disks from prepolymer organic precursors in the powder form composed of either or both polyimide and polybenzimidazole. The powders are consolidated (compressed) into disks and then pyrolyzed to form the desired porous carbon disk. Porous carbon-carbon composite disks are also prepared by adding carbon to the prepolymer organic precursors.

2 Claims, 2 Drawing Sheets

PROCESSES FOR PRODUCING MONOLITHIC POROUS CARBON DISKS FROM AROMATIC ORGANIC PRECURSORS

This is a continuation-in-part of U.S. application Ser. No. 10/919,450, filed Aug. 16, 2004.

BACKGROUND OF THE INVENTION

1. Field of the Invention

The present invention relates to the preparation of precursors composed of either or both polyimide and polybenzimidazole as organic precursors for producing monolithic porous carbon with density less than or equal to 1.0 g/cc; and the processes for producing monolithic porous carbon from either or both polyimide and polybenzimidazole precursors in the powder form. The present invention further relates to the processes for producing monolithic porous carbon derived from either or both polyimide and polybenzimidazole precursors having one or more than one metals dispersed therein. The present invention even further relates to the processes for producing carbon-carbon composite prepared from precursors comprising either or both polyimide and polybenzimidazole and activated carbon in the form of powders and/or fibers.

2. Description of Related Art

Monolithic porous carbon, which possess interpenetrating pore structure, high density, high surface area, suitable pore size, and well defined pore size distribution, are highly desirable as electrode materials for lithium batteries, electrochemical capacitors, fuel cells, as well as other electrochemical devices. The following description will be directed to disk products although it will be understood that other such products can be made from the porous carbon.

One approach to produce monolithic porous carbon disk is through sol-gel technologies. The sol-gel technology generally consists of preparation of gels from solution, drying the gel while minimizing the gel shrinkage. The pyrolysis of thin gel films yields porous monolithic carbon disks. RF carbon aerogel currently in the market as electrode material for supercapacitors is derived from resorcinol and formaldehyde organic precursors. RF carbon aerogel provide high surface area and narrow pore size distribution. Yet, the potential market of RF carbon aerogel as electrode and material for ultracapacitors and supercapacitors is severely limited by the low operating voltage of the capacitor ($\leq$5V) and high manufacturing cost of monolithic RF carbon aerogel materials.

Another approach to produce monolithic porous carbon disks is from powders of porous polymeric precursors by compressing them into a monolith disk followed by pyrolysis. There are 2 obstacles in this approach. One is the compressibility of the polymer precursor and the other is the difficulty in retaining interpenetrating network of the pores during the compression process. U.S. Pat. No. 6,544,648 discloses a process for making monolithic carbon disks by compressing carbon black powder with high surface area under vacuum at temperatures at or beyond 800° C. and a pressure at or beyond 3000 psi. This approach produces carbon disks with more undesirable micro-pores with pore diameter less than 2 nm than the ones by the sol-gel approach. The compression of carbon powder under vacuum at 800° C. displays severe technical challenges and high manufacturing costs.

Yet, another approach to produce monolithic porous carbon is from carbon black powder consolidated in a matrix of a carbonized synthetic resin. U.S. Pat. Nos. 5,776,633; 5,172,307; and 5,973,912 described processes of producing such porous carbon-carbon composites. The synthetic resin is phenolic resin in the patents. Although this approach has the merit of low cost by using inexpensive carbon black powder it has the difficulty in retaining open pores of synthetic resin, thus reducing the efficiency of pore surface area.

Bearing in mind the problems and deficiencies of prior art, it is therefore an object of the present invention to provide monolithic porous carbon disks with high surface area, high pore volume, high surface activity, well defined pore structure and morphology, and good mechanical properties. It would also be desirable to provide a process for producing such monolithic porous carbon disks with significantly lower cost as compared to the ones currently in the market.

Still other objects and advantages of the invention will in part be obvious and will in part be apparent from the specification.

SUMMARY OF THE INVENTION

The present invention provides processes for producing monolithic porous carbon, e.g., disks, from a group of aromatic organic precursors comprising either or both polyimide or polybenzimidazole. The processes include the steps of: (1) preparation of the organic precursors in the powder form; (2) consolidation of the powders into a monolith; (3) pyrolysis producing a monolithic porous carbon product such as a disk.

The present invention further provides processes for producing monolithic porous carbon disks doped with transition metals from a group of aromatic organic precursors comprising either or both polyimide or polybenzimidazole and metallic compounds. The processes include the steps of: (1) preparation of the precursors in-situ doped with metallic compounds in the powder forms; (2) consolidation of the powders into a monolith; (3) pyrolysis producing monolithic porous carbon product such as a disk.

The present invention even further provides processes for producing porous carbon-carbon composite from the precursors of this invention and carbon in the forms of powders, or fibers, or nanotubers, or bulky balls (C60, or C70, or others), or fullerenes, or a mixture thereof. Preferably, the carbon that is used in the present processes is activated carbon powder and activated carbon fiber. The processes include the steps of: (1) preparation of the precursors either in the powder form or a viscous solution; (2) blending together the carbon and the precursor in which the case of the solvent is removed after mixing; (3) consolidation of the mixture into a monolith; (4) pyrolysis producing a porous carbon-carbon composite.

The organic precursors of this invention have nitrogen-containing heterocyclic structures that connect monomer units into rod-like molecular chain structures with few flexible links or hinges. The chain architecture of the precursors consists of either linear chains, or a three-dimensional network, or hyberbranched chain structure. One group of the precursors comprises polyimide with imide group in the molecular structure. Another group of the precursors comprises polybenzimidazole with benzimidazole group in the molecular structure. Yet, another group of the precursors comprises both polyimide and polybenzimidazole with both imide and benzimidazole groups in the molecular structure.

The monolithic porous carbon disks produced from this invention can be further reinforced by fibers or fiber pads or other additive by incorporating fibers, inorganic or organic particles, fiber pads, or other additives during the compression molding process.

The precursor powders may be further assembled with other additives in addition to carbon before consolidation into a monolith. Such additives include transition metal oxide powders, organic particles, inorganic particles, graphite fibers or flakes, metal fibers, porous substrates including membranes, metallic meshes, carbon cloth, carbon felt, foams, and polymeric resins, such as phenolic resins and commercial polyimide resins.

The precursors prepared from the aromatic organic monomers of this invention may comprise other components in the molecular chain structure, such as polybenzimidazole, polyamide, polyetherimide, siloxane, or silica, but have the polyimide and aromatic organic composition preferably greater than or equal to 50% by weight.

The polyimide and polybenzimidazole may be represented by the formulas:

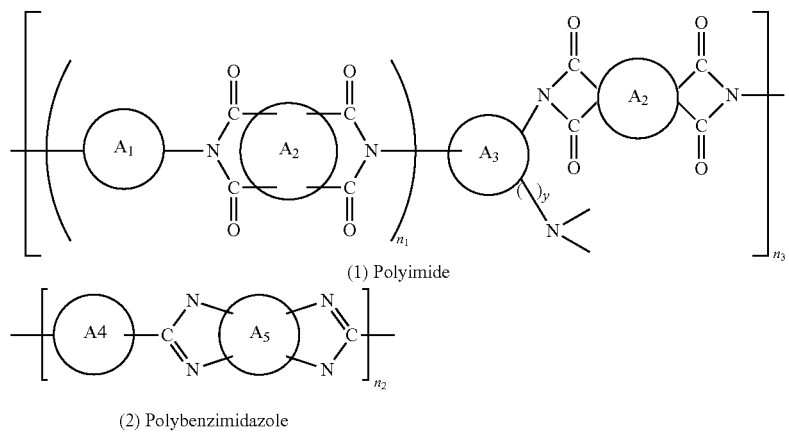

(1) Polyimide (2) Polybenzimidazole wherein A1 and A4
represent difunctional phenyl, difunctional biphenyl, an optionally substituted difunctional aryl, optionally substituted difunctional alkylene, an optionally substituted difunctional heteroaryl, or a combination thereof;
wherein A2 and A5 represents tetra functional phenyl, biphenyl, an optionally substituted tetra functional aryl group, or an optionally substituted heteroaryl group;
wherein A3
represent multifunctional phenyl with functionality more than or equal to 2, multifunctional biphenyl with functionality more than or equal to 2, an optionally substituted multifunctional aryl with functionality more than or equal to 2, optionally substituted multifunctional alkylene with functionality more than or equal to 2, an optionally substituted multifunctional heteroaryl with functionality more than or equal to 2, or a combination thereof;
n1, n2 and n3 are greater or equal to 1; and (y+2) are more than or equal to 2.

One application of this invention is to provide a novel carbon electrode for use in electrochemical capacitors, batteries, and fuel cells.

Another application of this invention is to provide a novel composite of carbon and transition metal oxides, such as MnO2, as an electrode for use in lithium batteries or hybrid-battery/electrochemical capacitor systems.

Another application of this invention is to provide a catalytic carbon support for use in fuel cells and electrochemical water purification systems.

While the present invention has been particularly described, in conjunction with a specific preferred embodiment, it is evident that many alternatives, modifications, and variations will be apparent to those skilled in the art of the foregoing description. It is therefore contemplated that the appended claims will embrace any such alternatives, modifications, and variations as falling within the true scope and spirit of the present invention.

BRIEF DESCRIPTION OF THE DRAWINGS

The features of the invention believed to be novel and the elements characteristic of the invention are set forth with particularity in the appended claims. The figures are for illustration purposes only and are not drawn to scale.

The invention itself, however, both as to organization and method of operation, may best be understood by reference to the detailed description which follows taken in conjunction with the accompanying drawings in which.

DESCRIPTION OF THE PREFERRED EMBODIMENT(S)

Figure 1:
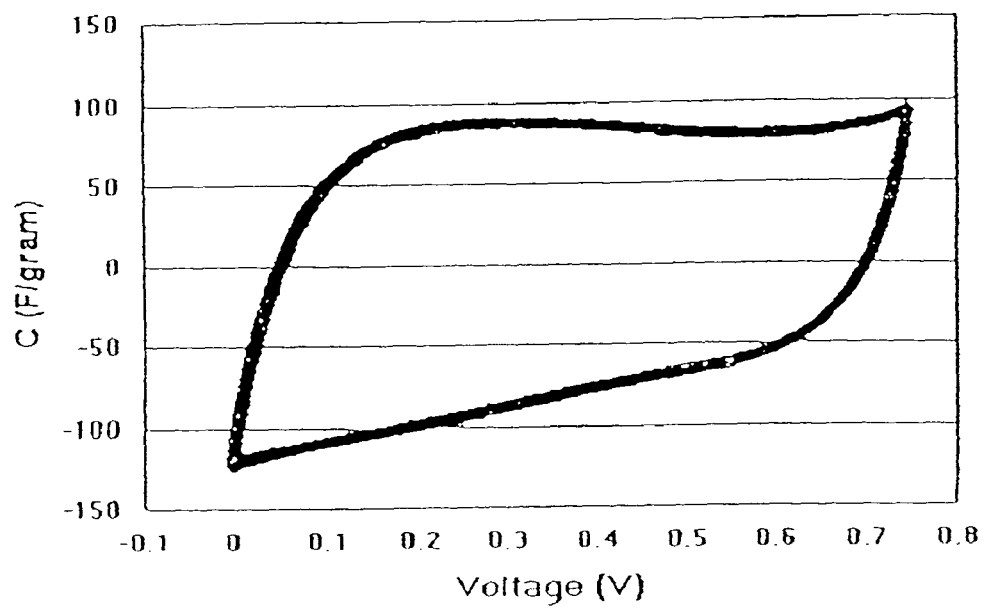
FIG. 1 is a cyclic voltammetry (CV) graph of Example 1 showing C (F/gram) versus voltage at a scan rate of 5 mV/sec.
Figure 2:
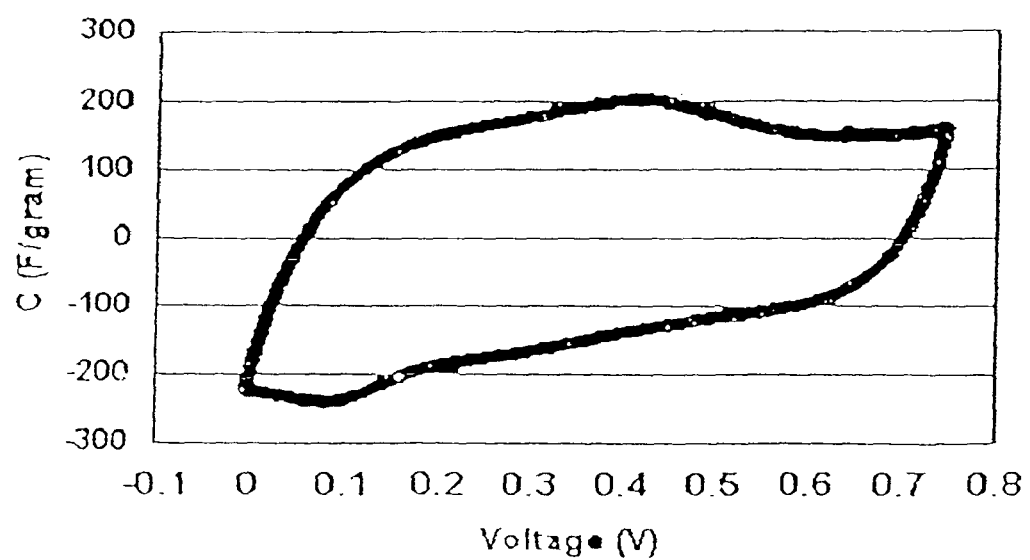
FIG. 2 is a cyclic voltammetry (CV) graph of Example 2 showing C (F/gram) versus Voltage at a scan rate of 5 mV/sec.
Figure 3:
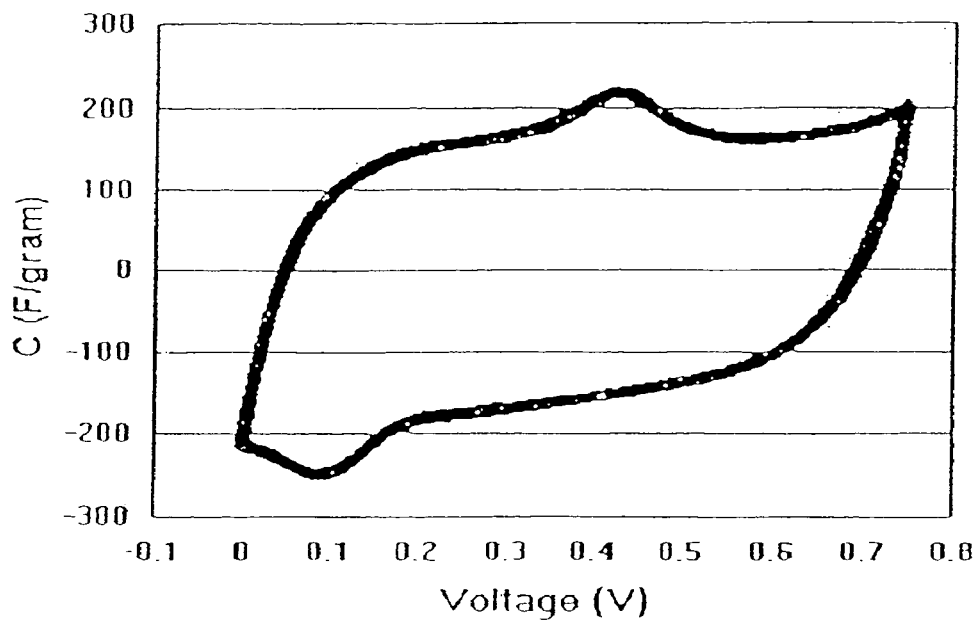
FIG. 3 is a cyclic voltammetry (CV) graph of Example 3 showing C (F/gram) versus Voltage at a scan rate of 5 mV/sec.
Figure 4:
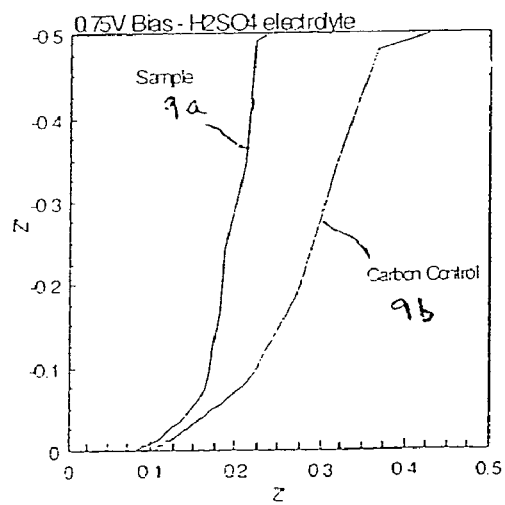
FIG. 4 is impedance data of Samples 9a and 9b at 0.75 V bias level with the sulfuric acid electrolyte. (—black) from Sample 9a and (—red) from the capacitor with Sample 9b.

In describing the preferred embodiment of the present invention, reference will be made herein to FIGS. 1-4 of the drawings in which like numerals refer to like features of the invention.

DETAILED DESCRIPTION OF THE INVENTION

In a first aspect, the present invention provides processes for producing monolithic disks comprising either or both polyimide and polybenzimidazole as organic precursors for producing monolithic porous carbon which have surface area at or above 500 m²/gram and sufficiently high mechanical strength.

The aromatic monomers for preparing polyimide precursors of this invention are preferably selected from one of the following groups: aromatic dianhydride, aromatic diamine, and as an option, an aromatic polyamine compounds with amine functionality beyond 2; or aromatic tetracarboxylic acids, aromatic diamine, and as an option, an aromatic polyamine compounds with amine functionality beyond 2; or ester(s) of aromatic tetracarboxylic acids, aromatic diamine, and as an option, an aromatic polyamine compounds with amine functionality beyond 2; or aromatic dianhydride, aromatic isocyanates including diisocyanate and polyisocyanate with functionality beyond 2.

The aromatic monomers for preparing polybenzimidazole precursors are preferably selected from one of the following monomer groups: aromatic dialdehydes and aromatic tetraamines; or diesters of aromatic dicarboxylic acids and aromatic tetraamines; or aromatic dicarboxylic acids and aromatic tetraamines.

The precursors comprising either or both polyimide and polybenzimidazole can preferably be synthesized from the monomers either in the presence of a solvent or in the melt state by the following procedures:

Procedure 1

Admixing all the ingredients in the presence of a solvent. The solvent is removed by distillation, assisted by vacuum if it is necessary to form a homogeneous mixture in the powder form. Further chemical reactions to produce un-fusible and un-meltable high molecular weight polymeric materials proceed after solvent removal or even after consolidation compression molding of the powders into a monolith such as a disk.

Procedure 2

Carrying out the condensation reaction of the aromatic monomers in the solution to produce precursors as a precipitate in the forms of either precipitate or gel. The precipitate could be either a precipitated powder or a precipitated film onto another solid substrate. The solvent in the precursors is removed by distillation, assisted by vacuum if it is necessary. The precursors are further ground into fine powder or porous particles, filtered through a sieve if it is necessary.

Procedure 3

Heating the aromatic organic precursors into the melted state with stirring to form precursors in the solid form. Sometimes, evaporation of byproducts, such as a low molecular weight alcohol or water, produces foams instead of dense solid. The precursor is further ground into fine powder or porous particles, filtered through a sieve if it is necessary.

The polyimide precursors are preferably condensation products of aromatic diamines and aromatic tetracarboxylic dianhydride, or aromatic diamines and tetracarboxylic acids, or aromatic diamines and ester(s) of tetracarboxylic acids, or aromatic isocyanates and aromatic tetracarboxylic dianhydride. As an option, a small amount of polyamine compounds with amine functionality greater than two takes the place of some of the aromatic diamine to introduce chemical crosslinks to the polyimide precursors. Therefore, polyimide precursors may possess linear molecular structure, or a hyperbranched molecular structure, or a three-dimensional network molecular structure. The synthesis of polyimide precursors generally proceeds in the synthesis of poly(amic acids) and then imidization to form polyimide.

Using the monomers of aromatic amines including diamines and polyamine compounds and acids or ester(s) of tetracarboxylic acids the synthesis of polyimide precursors can be carried out according to any of Procedures 1 to 3. In Procedure 1, the monomers and other additives are dissolved in a solvent to form a clear solution. The precursors in the form of fine powders are either a homogeneous mixture of monomers or a mixture of low molecular weight oligomers of polyimide and poly(amic acids). In Procedure 2, the monomers and other additives are dissolved in an organic solvent. The reaction is carried out with a normal agitation at or above 100° C., preferably at or above 150° C., to produce polyimide precipitate. The polyimide precursors are in the form of either precipitated powder or gels. The solvent is removed from the product by distillation, assisted by vacuum if it is necessary. In Procedure 3, preferably, the esters of tetracarboxylic acids and aromatic amines are the monomers of choice. The condensation reaction at molten state of monomers releases phenol or an alcohol molecule in the gas phase to produce rigid polyimide foams. The product is further ground to produce polyimide powder.

Using the monomers of aromatic dianhydride and aromatic amines including diamines and polyamines the synthesis of polyimide precursor is carried out according to Procedure 2 in two steps: synthesis of poly(amic acids) and imidization to form polyimide. The synthesis of poly(amic acids) is conducted by dissolving monomers and other additives in an organic solvent at ambient temperature with a normal agitation for a time period from several hours to overnight to yield product in the forms of either precipitated powder or viscous liquid solution or gels. The imidization of poly(amic acids) to form polyimide is carried out by either chemical imidization at ambient temperature or thermal imidization at elevated temperatures.

The chemical imidization is conducted by addition of dehydrating agents to poly(amic acids). In the cases of poly (amic acids) in the form of precipitated powder, preferably, dehydrating agents are added before the reaction solvent is removed from the system. In the cases of poly(amic acids) in the form of viscous solution, the addition of dehydrating agents to poly(amic acids) solution is carried out in such a way that the reaction at ambient temperature yields polyimide precipitate. The solvent is removed from the polyimide precipitate by distillation.

The dehydrating agents consists of either an acid anhydride or a mixture of an acid anhydride and an organic base. Preferred acid anhydrides include acetic anhydride, propionic anhydride, n-butyric anhydride, benzoic anhydride, and trifluoroacetic anhydride. Preferred organic bases include optionally substituted mono-, di-, trialkylamines, and optionally substituted pyridines.

The thermal imidization is conducted at elevated temperatures.

In the cases of poly(amic acids) in the form of precipitated powder, the solvent is removed by distillation followed by a thermal imidization of poly(amic acids) powder at a temperature in the range of 50° C. to 500° C. preferably in the range of 100° C. to 400° C. and preferably under protection of an inert gas, such as nitrogen or argon. In the cases of poly(amic acids) in the form of viscous liquid solution or gels the imidization is conducted at elevated temperatures in the range of 50° C. to 400° C., preferably in the range of 100° C. to 250° C. to produce polyimide in the form of precipitated powder. The solvent is removed by distillation, assisted by vacuum if it is necessary.

Using aromatic dianhydride and aromatic isocyanate including diisocyanate and polyisocyanate as the organic precursor the synthesis of polyimide precursors is preferably carried out according to Procedure 1. In this procedure, the monomers and additives are admixed at ambient temperature in the presence of preferably a dipolar aprotic organic solvent. The solvent removal produces a homogeneous mixture in the powder form.

Although not exclusive to the other synthetic procedures, preferably, polyimide precursors are prepared from aromatic monomers of tetracarboxylic dianhydride, aromatic diamine, and optionally, a polyamine compound according to Procedure 2 using thermal imidization method. In this procedure, the reaction of monomers and other additives are conducted in an organic solvent, such as dimethylacetamide (DMAc), at ambient temperature with agitation for a period of time. Temperature of the reaction system is then raised to the range of 130° C. to 200° C., preferably in the range of 150° C. to 180° C. to produce polyimide as precipitate. The solvent is distilled off to produce the dried polyimide precursor powder.

The polybenzimidazole precursors are preferably condensation products of aromatic tetraamines and aromatic esters of dicarboxylic acids, or aromatic tetraamines and aromatic dialdehyde. The synthesis proceeds either in the molten state of monomers or in the presence of a solvent.

Using aromatic tetraamine and aromatic dialdehyde as aromatic monomers the synthesis of polybenzimidazole is carried out according to Procedure 2 in two-stages: synthesis of poly(azomethines) as intermediate product in the presence of an organic solvent and synthesis of poly(benzimidazole). In this procedure, the reaction of the monomers in an organic solvent is carried out at temperatures in the range of −30° C. and ambient temperature to produce poly(azomethines) in the forms of either precipitated powder or viscous liquid solution. Further reaction at an elevated temperature in the range of 50° C. to 350° C., more preferably in the range of 100° C. to 250° C., converts poly(azomethines) to polybenzimidazole. The solvent is removed from the system when the product precipitated from the solution either before or after second stage reaction at elevated temperatures.

Using the monomers of aromatic tetraamine and esters of dicarboxylic acids the synthesis of polybenzimidazole proceeds preferably according to Procedure 3 in the molten state of the monomers although not exclusive to the synthesis in the presence of a solvent. The reactions are conducted at or above melting temperatures of the monomers with strong agitation and in such conditions that side products of phenol, or water, or an alcohol in the gas phase are released from the system to produce the product in foams. The products are crushed and further ground to produce polybenzimidazole precursors in the form of porous powder.

The precursors comprising both polyimide and polybenzimidazole segments in the molecular structure can be prepared preferably in the presence of an organic solvent. The synthesis can be conducted by either synthesizing one precursor of either polyimide or polybenzimidazole before adding the monomers for the other precursor to the reaction system. Or the reactions of polyimide and polybenzimidazole are carried out separately before combining two reactions into one reaction system. Or two sets of the monomers are mixed together simultaneously in the same reaction solution when the reaction conditions are compatible. Yet, such mixing would be generally prohibited if a relatively large amount of flexible amide links were introduced to the molecular chain structure so as to reduce the glass transition temperature of the material significantly.

An alternative approach to prepare monolithic porous carbon disks from precursors comprising both polyimide and polybenzimidazole is mixing both powders of polyimide and polybenzimidazole precursors together during the process of consolidating the powders into a monolith disk.

As an option, the precursor powders comprising either or both polyimide and polybenzimidazole are further broken down to smaller particle size by a shear stress and filtered through a sieve if it is necessary. The preferred particle size of precursors for the purpose of compression molding is in the range of 1 µm to 300 µm, more preferably in the range of 5 µm to 75 µm, even more preferably in the range of 10 µm to 50 µm.

As another option, the precursor powder comprising either or both polyimide and polybenzimidazole in the powder form is further thermally annealed at elevated temperatures before consolidating into a disk. The annealing is conducted in a temperature range of 50° C. to 600° C., more preferably in the range of 50° C. to 500° C. for a time period between 20 minutes to 2 hours under vacuum or under protection of argon or nitrogen atmosphere.

In a second aspect, the present invention provides processes for producing porous monolithic disks of transition metal doped precursors comprising either or both polyimide and polybenzimidazole as organic precursors for producing transition metal doped monolithic porous carbon disks which have surface area at or above 500 $m^2$/gram, sufficiently high mechanical strength, and macrocyclic pyridine structure wherein the transition metal atoms caged or complexed into to provide catalytic activities.

In a general procedure, a transition metallic compound in solution is added to the reaction system or to the dried precursor powder or to the dried disk precursor. The solvent used for dissolving the transition metallic compound is preferably the same solvent as the one for preparing the precursors. Although not exclusive to the addition of the metallic compounds at any stage or any step during preparation of the monolith disk including each synthetic step of the condensation reaction and the consolidation process, preferably, the transition metallic compounds are added during the early stages of the procedures. Even more preferably, the transmission metallic compounds are admixed with the organic precursors in the presence of an organic solvent before proceeding with the synthesis of the precursors.

The solvent removal during the synthesis of the precursors comprising either or both of polyimide and polybenzimidazole are conducted by distillation, preferably assisted by vacuum.

Metals suitable for use in the preparation of metal doped monolithic porous carbon of this invention are not limited and may include elemental metals, organometallic compounds, coordination inorganic compounds, metal salts or any combinations thereof. The preferred metals include Ti, Zr, V, Nb, Cr, Mo, Mn, Fe, Ru, Co, Rh, Ni, Pd, Pt, Cu, Ag, Zn, Si, Sn, Pb, Sb, Nb, Bi, Hf, Ba, Al, B, P As, Li and combinations thereof. Exemplary transition metal compounds include cobalt chloride ($CoCl_2$), iron chloride ($FeCl_3$), nickel chloride ($NiCl_2$), molybdenum chloride ($MoCl_5$), hydrogen hexachloroplatinate hydrate ($H_2PtCl_6*xH_2O$), copper chloride ($CuCl_2$), tungsten chloride ($WCl_6$), zirconium chloride ($ZrCl_4$), cerium nitrate ($Ce(NO_3)3$), ruthenium chloride ($RuCl_3$) and hafnium chloride ($HfCl_4$).

Typically, the transition metallic compound is present in the precursor in an amount from 0.01% to 20% by weight, or more.

In a third aspect, the present invention provides processes for producing monolithic porous carbon disks which has a rod density of less than or equal to 1.0 gram/cc comprising: producing the organic precursors in powders comprising either or both polyimide and polybenzimidazole; consolidation of the powder into a monolith under a pressure in the range of 3000 psi to 13000 psi; and pyrolysis under protection of an inert atmosphere.

In a fourth aspect, the present invention provides processes for producing monolithic porous carbon having one or more than one metals dispersed therein, which has a rod density of less than or equal to 1.0 gram/cc comprising: powders of transition metal doped precursors comprising either or both polyimide and polybenzimidazole; consolidation of the porous precursor powders into a monolith preferably at ambient temperature under a pressure in the range of 3000 psi to 13000 psi. and pyrolysis under protection of an inert atmosphere.

In a general consolidating procedure, the precursor powders are evenly placed in a mold or on a supporting substrate such as a fiber pad, before a sufficiently high compression pressure and a sufficient holding time are applied to produce a monolith disk with rod density in the range of 0.4 g/c to 1.0 g/c, preferably 0.6 g/cc to 0.95 g/cc.

Pyrolysis of the compressed disks is carried out under protection of an inert gas atmosphere, such as argon, nitrogen or carbon dioxide, at a temperature in the range of 600° C. to 3000° C., more preferably 750° C. to 1500° C. As an option, the inert gas atmosphere may be changed to carbon dioxide during the pyrolysis, preferably in the later stage of the pyrolysis, to further activate the pore surface of the monolithic carbon disk. The heating rate shall be sufficiently slow as to optimize the properties of the monolithic carbon.

In fifth aspect, the present invention provides processes for producing porous carbon-carbon composite with a rod density of less than or equal to 1.0 gram/cc from the precursors comprising either or both polyimide or polybenzimidazole and activated carbon in the forms of powder and fiber comprising: blending the precursor, carbon, and other additives thoroughly; removing the solvent in the mixture in cases that a solvent is involved in the mixture; consolidating the mixture into monolith under pressure conditions as to produce a homogeneous composition with desired rod density; and pyrolysis under an inert atmosphere for producing monolithic porous carbon.

In a sixth aspect, the present invention provides processes for producing porous carbon composites incorporating other additives in addition to the carbon comprising: blending the organic precursor of this invention, carbon, and other additives thoroughly; removing the solvent in the mixture in cases that a solvent is involved during the mixing; consolidating the mixture into monolith under pressure conditions as to produce a homogeneous composition with desired rod density; and pyrolysis under an inert atmosphere for producing monolithic porous carbon.

Other additives include metallic compounds, silica, carbon in the forms of powders, fibers, nanotubes, and bulkyballs or fullerences, graphite, metal oxides and metal carbides, polymeric resins in either liquid or powder forms, such as commercial phenolic resins and commercial polyimide resins, and mixtures thereof.

The additives can be in the forms of powders, fibers, flakes, liquids, or porous substrates composed of one or more than one kind of fibers, membranes, metallic meshes, and foams.

There are different ways to blend the polyimide precursor, carbon, and other ingredients together. For example in the cases of polyimide precursors, one way of blending is to thoroughly mix polyimide powder with the carbon and other additives. Another way is to coat viscous solution of poly (amic acid) onto carbon and other additives before removing the solvent, then converting poly(amic acids) to polyimides. The present invention is directed in one aspect to simply mixing the polyimide precursor powder with the carbon and other additives, but is not intended to be limited to any particular way of blending the precursor with the carbon as well as other additives.

The organic precursors comprising either or both polyimide and polybenzimidazole suitable for use in the method of making monolithic porous carbon disks of the present invention can incorporate other components during the synthesis, such as imidazopyrrolone, siloxane, silica, epoxy, bismaleimide, polyetherimide, but have the composition of polyimide and/or polybenzimidazole preferably greater than or equal to 70% by weight.

Preferred aromatic tetracarboxylic dianhydride, or tetracarboxylic acids, or diester(s) of tetracarboxylic acids monomers suitable for use in the method of making polyimide precursors of the present invention include following dianhydride compounds and their derivatives of tetracarboxylic acids and dialkyl ester(s) of tetracarboxylic acids: pyromellitic dianhydride; pyromellitic tetracarboxylic acids, dialkyl ester(s) of pyromellitic tetracarboxylic acids and aromatic tetracarboxylic dianhydride or tetracarboxylic acids or esters of the tetracarboxylic acids including 3,3',4,4'-biphenyltetracarboxylic acid dianhydride, 3,3',4,4'-benzophenone dianhydride, 2,3,6,7-naphthylene tetracarboxylic acid dianhydrides, 1,4,5,8-naphthalene tetracarboxylic acids, 2,2-bis (3,4-dicarboxy phenyl) propane acid dianhydride, and combinations thereof.

When ester(s) are alkyl esters the alkyl group preferably contains 1 to 5 carbon atoms and is more preferably methyl.

Preferred aromatic diamine monomers suitable for use in the methods of making polyimide precursors of the present invention include 1,4-phenylene diamine, m-phenylene diamine, 4,4'diamino-biphenyl, 4,4' and 3,3'-diaminodiphenylmethanes, 4,4', and 3,3'-diaminobenzophenones, benzidine, 2,6-diaminopyridine, 2,6-diaminonaphthalene, 1,4-diaminocyclohexane, 2,4 and 2,6-diaminotoluene, and derivatives thereof (i.e.: substituted diamine having a substituent(s)). The above diamine monomers may be used alone or as a mixture of two or more of them.

Preferred polyamine compounds with amine functionality greater than 2 suitable for use in the methods of making polyimide precursors of the present invention include 3,3'4, 4'-biphenyltetraamine (TAB), 1,2,4,5-benzenetetraamine, 3,3'4,4'-tetraaminodiphenyl ether, 3,3'4,4'-tetraaminodiphenylmethane, 3,3',4,4'-tetraaminobenzophenone, 3,3',4-triaminodiphenyl, 3,3',4-triaminodiphenylmethane, 3,3',4-triaminobenzophenone, 1,2,4-triaminobenzene, their mono-, di-, tri-, or tetra-acid salts, such as 3,3'4,4'-biphenyltetraamine tetrahydrochloride, 1,2,4,5-benzenetetraamine tetrahydrochloride, 3,3'4,4'-tetraaminodiphenyl ether tetrahydrochloride, 3,3'4,4'-tetraaminodiphenylmethane tetrahydrochloride, 3,3',4,4'-tetraaminobenzophenone tetrahydrochloride, 3,3',4-triaminodiphenyl trihydrochloride, 3,3',4-triaminodiphenylmethane trihydrochloride, 3,3',4-triaminobenzophenone trihydrochloride, 1,2,4-triaminobenzene trihydrochloride, melamine, 2,4,6-triaminopyrimidine (TAP). The acid salts of above compounds usually exist in the form of hydrated compounds. Any of the above compounds may be used either alone or as a mixture of two or more of them.

Preferred polyamine compounds with amine functionality greater than 2 suitable for use in the methods of making polyimide precursors composed of a three-dimensional molecular structure of the present invention also include a polyamine oligomer with the formula:

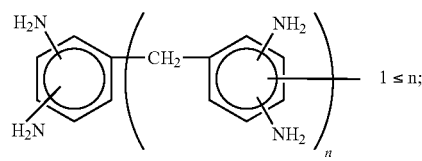

Preferred aromatic isocyanate monomers suitable for use in the methods of making polyimide precursors of the present invention include 1,3-phenylene diisocyanate, 1,4-phenylene diisocyanate, 4,4'-diphenylmethane diisocyanate. Any of the above compounds may be used either alone or as a mixture of two or more of them.

Preferred aromatic dialdehyde monomers suitable for use in the methods of making polybenzimidazole precursors of the present invention include isophthalaldehyde, terephthaldicarboxaldehyde, phthalic dicarboxaldehyde, and 2,6-naphthalenedicarboxaldehyde.

Preferred monomers of aromatic acids and esters of dicarboxylic acids suitable for use in the methods of making polybenzimidazole precursors of the present invention include acids and esters of isophthalic acid, phthalic acid, terephthalic acid, 1,4-naphthalenedicarboxylic acid, and 2,6-naphthalenedicarboxylic acid. The ester(s) may be alkyl or phenyl esters. When ester(s) are alkyl esters the alkyl group preferably contains 1 to 5 carbon atoms and is more preferably methyl.

Preferred monomers of aromatic tetraamines suitable for use in the methods of making polybenzimidazole precursors of the present invention include 3,3',4,4'-tetraaminobiphenyl (3,3'-diaminobenzidine); 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-tetraaminodiphenyl ethane; 3,3',4,4'-tetraaminodiphenyl-2,2-propane; and combinations thereof.

Preferred reaction solvents for the synthesis of the precursors comprising either or both polyimide and polybenzimidazole include N-methyl-2-pyrrolidinone (NMP), N,N-dimethylacetamide (DMAc), N,N-dimethyl formamide (DMF), tetrahydrofuran (THF), dimethyl sulfoxide (DMSO), acetone, methanol, toluene, chlorobenzene, ethanol, and mixtures thereof.

The monolithic carbon of this invention is suitable for use as an electrode material in electrochemical capacitors and related electrochemical devices. The porous monolithic carbon of the invention offer the advantage of a monolithic structure, high density, high surface area, and narrow pore size distribution.

EXAMPLES

Example 1

Synthesis of Polyimide Precursor with Three-dimensional Molecular Structure and Carbon Disk Therefrom Starting monomers: 3,3'4,4'-biphenyltetraamine (TAB), 1,2,4,5-benzenetetracarboxylic dianhydride (PMDA), and 1,4-phenylenediamine (PPD).
Solvent: N,N-dimethylacetamide (DMAc).

1.30 gram (0.012 mole) PPD was dissolved in 40 ml DMAc in a flask. While stirring, 3.270 gram (0.015 mole) PMDA in the solid form was added to the reaction system. After PMDA was fully dissolved, 0.3215 gram (0.0015 mole) TAB was added to the reaction system. The reaction was carried out at ambient temperature with mechanical stirring until a very viscous solution, often gel lumps, were formed. The temperature of the reaction was gradually raised to 150° C. with strong agitation to produce polyimide in precipitated powder form. The solvent was distilled off under vacuum at 50° C. The powders were further broken down and filtered through a 50 micron-sized sieve.

By using a hydraulic press, the polyimide powders were placed in a mold and compressed under pressure of 5000 psi at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 90 F/gram. See FIG. 1.

Example 2

Synthesis of Polyimide Prepolymer with Three-dimensional Molecular Structure Doped with 1% Molybdenum by Weight and Carbon Disk Therefrom Starting monomers and additive: 3,3'4,4'-biphenyltetraamine (TAB), 1,2,4,5-benzenetetracarboxylic dianhydride (PMDA), 1,4-phenylenediamine (PPD), and molybdenum chloride (V) (MoCl5).
Solvent: N,N-dimethylacetamide (DMAc).

1.30 gram (0.012 mole) PPD and 0.135 gram MoCl5 were dissolved in 40 ml DMAc in a flask. While stirring, 3.270 gram (0.015 mole) PMDA in the solid form was added to the reaction system. After PMDA was fully dissolved, 0.3215 gram (0.0015 mole) TAB was added to the reaction system. The reaction was carried out at ambient temperature with mechanical stirring until a very viscous solution, often gel lumps, were formed. The temperature of the reaction was gradually raised to 150° C. with strong agitation to produce polyimide/MoCl5 in precipitated powder form. The solvent was distilled off under vacuum at 50° C. The powders were further broken down and filtered through a 50 micron-sized sieve.

The polyimide powders were consolidated at 4500 psi pressure at ambient temperature to produce a monolithic disk. The monolithic disk was pyrolyzed at 800° C. for 3 hours under protection of a nitrogen to produce a monolithic carbon disk. The cyclic voltammetry of the carbon disk at a scan rate of 5 mV/s displayed the capacitance of the material at 210 F/gram. See FIG. 2.

Example 3

Synthesis of Polyimide Prepolymer Doped with 1% Molybdenum by Weight and Carbon Disk Therefrom Starting monomers and additive: 1,2,4,5-benzenetetracarboxylic dianhydride (PMDA), 1,4-phenylenediamine (PPD), and molybdenum chloride (V) (MoCl5).
Solvent: N,N-dimethylacetamide (DMAc).

1.622 gram (0.015 mole) PPD and 0.135 gram MoCl5 were dissolved in 40 ml DMAc in a flask. While stirring, 3.270 gram (0.015 mole) PMDA in the solid form was added to the reaction system. The reaction was carried out at ambient temperature with stirring until a very viscous solution was formed. The reaction temperature was raised to 150° C. with strong agitation to produce polyimide/MoCl5 precipitate in precipitated powder form. The solvent was distilled off under vacuum at 50° C. The powders were further broken down and filtered through a 5-micron-sized sieve.

The polyimide powders were consolidated at 4500 psi pressure at ambient temperature to produce a monolith. Pyrolysis of the monolith was carried out at 800° C. for 2 hours under a nitrogen atmosphere and 1 hour under a carbon dioxide atmosphere. The cyclic voltammetry of the carbon disk at a scan rate of 5 mV/s, shown in FIG. 3, displayed the capacitance of the material at 200 F/gram.

Example 4

Synthesis of Polyimide Precursor Doped with 1% (by Wt.) Molybdenum in Acetone and Carbon Disk Therefrom Starting monomers and additive: 3,3'4,4'-biphenyltetraamine (TAB), 1,2,4,5-benzenetetracarboxylic dianhydride (PMDA), 1,4-phenylenediamine (PPD), and molybdenum chloride (V) (MoCl5).
Solvent: acetone 3.270 gram (0.015 mole) PMDA was dissolved in 20 ml acetone. 1.30 gram (0.012 mole) PPD, 0.3215 gram (0.0015 mole) TAB, and 0.135 gram MoCl5 were dissolved in 20 ml acetone in a separate flask. The PMDA solution was gradually added to PPD/TAB/MoCl$_5$ solution to produce a white precipitate immediately. The solvent was distilled off and temperature of the product was raised to 150° C. to convert poly(amic acids) to polyimide in powder form. The powders are further broken down and filtered through a 50 micron-sized sieve.

The polyimide powder was compressed at 4000 psi pressure at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 100 F/gram.

Example 5

Synthesis of Polyimide Precursor with Three-dimensional Molecular Structure Doped with 1% Molybdenum by Weight and Carbon Disk Therefrom Starting monomers and additive: 3,3'4,4'-biphenyltetraamine (TAB), 1,2,4,5-benzenetetracarboxylic dianhydride (PMDA), 1,4-phenylenediamine (PPD), diaminopyridine, and molybdenum chloride (V) (MoCl5).
Solvent: N,N-dimethylacetamide (DMAc).

1.082 gram (0.01 mole) PPD, 0.218 gram diaminopyridine (0.002 mole) and 0.135 gram MoCl5 were dissolved in 40 ml DMAC in a flask. While stirring, 3.270 gram (0.015 mole) PMDA in the solid form was added to the reaction system. After PMDA was fully dissolved, 0.3215 gram (0.0015 mole) TAB was added to the reaction system. The reaction was carried out at ambient temperature with a normal agitation until a viscous solution was formed. The temperature of the reaction was raised to 150° C. with strong agitation to produce polyimide/MoCl5 in precipitated powder form. The solvent was distilled off under vacuum at 50° C. The powders were further broken down and filtered through a 50 micron-sized sieve.

The polyimide powder were compressed at 4000 psi pressure at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 100 F/gram.

Example 6

Synthesis of Polyimide Prepolymer and Porous Carbon Therefrom

Starting monomers: 1,2,4,5-benzenetetracarboxylic dianhydride (PMDA), and 1,4-phenylenediamine (PPD).
Solvent: N,N-dimethylacetamide (DMAc).

1.622 gram (0.015 mole) PPD was dissolved in 40 ml DMAc in a flask. While stirring, 3.270 gram (0.015 mole) PMDA in the solid form was added to the reaction system. The reaction was carried out at ambient temperature with stirring until a very viscous solution was formed. The reaction temperature was raised to 150° C. with strong agitation to produce polyimide precipitate. The solvent was distilled off under vacuum at 50° C. The powders were further annealed at 300° C. for 30 minutes.

The polyimide powders were consolidated at 4500 psi pressure at ambient temperature to produce a monolith. Pyrolysis of the monolith was carried out at 900° C. for 3 hours under a nitrogen atmosphere. The cyclic voltammetry of the carbon disk at a scan rate of 5 mV/s displayed the capacitance of the material at 80 F/gram.

Example 7

Electrode for Supercapacitor

A supercapacitor was constructed using the carbon prepared according to Example 3 as electrodes. The electrode dimension was 0.81" in diameter and 0.012" in thickness. The prototype supercapacitor comprises a pair of carbon electrodes sandwiched between two current collector plates. A microporous separator was placed between two electrodes. 38% sulfuric acid electrolyte impregnates the electrodes and the separator before the current plates were sealed by a thermoplastic edge sealant. The result of characterization is shown in Table 1.

TABLE 1

| ESR (Ohm) at 1 kHz | C (F.) | Normalized (F/g) | Capacitance (F/cm$^3$) |
|---|---|---|---|
| 0.32 | 7.58 | 203 | 156 |

Example 8

Synthesis of Polyimide Precursor Doped with 0.5% Molybdenum and Porous Carbon Therefrom Starting monomers and additive: 1,2,4,5-benzenetetracarboxylic dianhydride (PMDA), 1,4-phenylenediamine (PPD), and molybdenum chloride (V) (MoCl5).
Solvent: tetrahydrofuran (THF).

3.270 gram (0.015 mole) PMDA was dissolved in 20 ml THF. 1.62 gram (0.015 mole) PPD, and 0.065 gram MoCl5 were dissolved in 20 ml THF in a separate flask. The PMDA solution was gradually added to PPD/MoCl5 solution to produce a white precipitate immediately. The solvent was distilled off. The poly(amic acids) powder was converted to polyimide by thermally annealed at 300° C. for 30 minutes.

The polyimide powders were compressed at 4500 psi pressure at ambient temperature to produce a monolith. The monolith was pyrolyzed at 900° C. for 3 hours under protection of nitrogen to produce a monolithic carbon. The cyclic voltammetry of the carbon disk at a scan rate of 5 mV/s displayed the capacitance of the material at 150 F/gram.

Example 9a

Preparation of Carbon-Carbon Composite and an Electrochemical Capacitor Cell Therefrom Polyimide precursor: prepared in Example 6.
Carbon Black Powder: commercially available carbon black from a natural source;
Activated Carbon fiber: phenolic resin based carbon fiber.

1.58 gram carbon black powder (66%), 0.68 gram polyimide powder (28%), and 0.14 gram carbon fiber (6%) were blended together by grinding and mixing 0.5 gram mixture was compressed at 6500 psi at ambient temperature to produce a monolithic disk about 1 mm thick and 2.5 cm in diameter. The disk was pyrolyzed at 800° C. for 3 hours under protection of nitrogen to produce a porous carbon-carbon composite disk.

Two carbon-carbon composite disks of 0.78 gram with diameter of 2.5 cm and thickness of 1.20 mm were used to assemble a symmetric single cell according to the procedure in Example 3. The result of characterization is listed in Table 2. A Z" vs. Z' plot of impedance data is displayed in FIG. 4.

Example 9b

A Comparative Electrochemical Capacitor Cell Using Carbon Black Electrodes

Two carbon disks of 0.77 gram with diameter of 2.5 cm and thickness of 1.20 mm were prepared from same carbon black powder as used in Example 9a. The disks were used to assemble a symmetric single cell according to the procedure in Example 3. The result of characterization is listed in Table 2. A Z" vs. Z' plot of impedance data is displayed in FIG. 4.

TABLE 2

| ID | ESR (Ohm) at 1 kHz | C (F.) | Normalized C (F/g) |
|---|---|---|---|
| C—C composite (Example 9a) | 0.082 | 30.25 | 154 |
| Control carbon (Example 9b) | 0.101 | 22.44 | 116 |

Example 10

Preparation of Carbon-Carbon Composite Doped with 0.85% Molybdenum and an Electrochemical Capacitor Cell Therefrom Polyimide precursor: prepared in Example 1.
Carbon Black Powder: commercially available carbon black from a natural source;
Activated Carbon fiber: phenolic resin based carbon fiber;
Molybdenum chloride (V) (MoCl5).

0.06 gram molybdenum chloride was dissolved in 3.0 ml methanol. 2.6 gram carbon black powder was immersed in Mo/methanol solution with stirring for overnight before methanol was removed by distillation.

1.24 gram Mo doped carbon black powder (61%), 0.665 gram polyimide powder (33%), and 0.12 gram activated carbon fiber (6%) were blended together by grinding and mixing. 0.5 gram mixture was compressed at 6500 psi at ambient temperature to produce a monolithic disk about 1 mm thick and 2.5 cm in diameter. The disk was pyrolyzed at 800° C. for 1.5 hours under protection of nitrogen and 1.5 hours under carbon dioxide to produce a porous carbon-carbon composite disk.

Two carbon-carbon composite disks with diameter of 2.5 cm and thickness of 1.20 mm were used to assemble a symmetric single cell according to the procedure in Example 3.

Thus, having described the invention, what is claimed is:

1. A process for producing monolithic porous carbon disks as electrode materials from precursors comprising either or both polyimide and polybenzimidazole in the powder form comprising the steps of:
   preparing a precursor powder comprising either or both polyimide and polybenzimidazole;
   adding activated carbon powder and activated carbon fiber to the precursor powders to form a mixture;
   consolidating the mixture into a monolith under pressure;
   pyrolyzing the monolith in an inert atmosphere or carbon dioxide to form a carbon-carbon composite.

2. The process of claim 1 wherein the carbon in the composition of the carbon-carbon composite before pyrolysis is in the range of 5 to 90%.

* * * * *